United States Patent Office.

WILLIAM M. WELLING, OF NEW YORK, N. Y.

Letters Patent No. 98,727, dated January 11, 1870; antedated January 1, 1870.

IMPROVED COMPOSITION RESEMBLING HORN.

The Schedule referred to in these Letters Patent and making part of the same.

*To all whom it may concern:*

Be it known that I, WILLIAM M. WELLING, of the city and State of New York, have invented and made a new and useful Improvement in Composition Resembling Horn; and I do hereby declare the following to be a full, clear, and exact description of the said invention, and of the features that distinguish my said invention from previous compositions.

A composition has heretofore been made resembling ivory, in which the ingredients are mixed together and then ground between heated rollers, to render the composition uniform and plastic, and intimately mix the ingredients.

In this connection, an express reference is made to Letters Patent granted to me August 4, 1857, No. 17,949, in which shellac, with ivory-dust and other materials, are mixed as aforesaid, and moulded in warm moulds into various shapes and articles.

In Letters Patent granted to me, as assignee of Alfred Starr, March 3, 1868, No. 75,067, shellac and fibrous material, such as asbestos, were employed, the materials being compounded, mixed, and moulded, substantially the same as in the first-named patent.

Wood-dust, ivory-dust, and bone-dust have also been employed in connection with the materials named in said patents. (See Letters Patent No. 89,100, granted to me April 20, 1869.)

My present invention is an improvement upon the aforesaid patents, and relates to a new composition to be worked and moulded the same as set forth in the aforesaid patents.

I make use of shellac and vegetable or animal fibre mixed together, and worked or ground between rollers, in the presence of sufficient heat to render the mass plastic, and then moulded, as in aforesaid patent.

In my present improvement, I make use of about one part, by weight, of shellac, to one-half part, by weight, of cotton, wool, or other animal or vegetable fibre.

I find that it is best to mix the ingredients together in a dry state, the fibre being in short pieces or in the form of flock, and according to the firmness of the fibre and the extent to which they are ground together, so the materials formed from such composition will be more or less mottled in appearance, similar to horn, and various colors may be produced by the color previously given to the fibrous material.

Different pigments may also be mixed into the composition, to give the same the desired color and impart more or less weight, so that articles made from said composition will be of the desired gravity.

This composition possesses great strength, and the grinding of the mass between rollers in a plastic state causes the shellac to fill the pores of the fibre to a large extent, rendering the same water-proof, or nearly so.

What I claim, and desire to secure by Letters Patent, is—

The composition herein specified, prepared in the manner set forth.

In witness whereof, I have hereunto set my signature, this 21st day of June, 1869.

WM. M. WELLING.

Witnesses:
GEO. D. WALKER,
GEO. T. PINCKNEY.